US007996560B2

(12) United States Patent
Murakami et al.

(10) Patent No.: US 7,996,560 B2
(45) Date of Patent: Aug. 9, 2011

(54) MANAGING VIRTUAL PORTS IN AN INFORMATION PROCESSING SYSTEM

(75) Inventors: Toshihiko Murakami, Fujisawa (JP); Atsuya Kumagai, Kawasaki (JP); Naoko Iwami, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1642 days.

(21) Appl. No.: 10/652,909

(22) Filed: Aug. 28, 2003

(65) Prior Publication Data

US 2005/0010688 A1 Jan. 13, 2005

(30) Foreign Application Priority Data

Jun. 17, 2003 (JP) ................................ 2003-171475

(51) Int. Cl.
*G06F 15/16* (2006.01)
(52) U.S. Cl. ...................................................... 709/245
(58) Field of Classification Search .................... 709/245
See application file for complete search history.

(56) References Cited

U.S. PATENT DOCUMENTS

| 6,052,795 | A | 4/2000 | Murotani et al. |
| 6,446,141 | B1 | 9/2002 | Nolan et al. |
| 6,553,408 | B1 | 4/2003 | Merrell et al. |
| 6,601,101 | B1 | 7/2003 | Lee et al. |
| 6,625,747 | B1 * | 9/2003 | Tawil et al. ........................ 714/6 |
| 6,715,098 | B2 * | 3/2004 | Chen et al. ........................ 714/3 |
| 6,988,130 | B2 * | 1/2006 | Blumenau et al. ............ 709/213 |
| 7,606,239 | B2 * | 10/2009 | Maveli et al. ................ 370/398 |
| 2002/0133746 | A1 * | 9/2002 | Chen et al. ........................ 714/13 |
| 2002/0184439 | A1 | 12/2002 | Hino et al. |
| 2003/0131182 | A1 * | 7/2003 | Kumar et al. ...................... 711/5 |
| 2003/0140193 | A1 * | 7/2003 | Acharya et al. ................. 711/112 |
| 2003/0147395 | A1 * | 8/2003 | Gutknecht et al. ............. 370/393 |
| 2003/0189929 | A1 * | 10/2003 | Matsuzaki et al. ............. 370/389 |
| 2003/0191904 | A1 | 10/2003 | Iwami et al. |
| 2003/0221001 | A1 * | 11/2003 | Moran et al. .................... 709/224 |
| 2004/0081087 | A1 * | 4/2004 | Shea ............................... 370/228 |
| 2004/0088574 | A1 | 5/2004 | Walter et al. |

FOREIGN PATENT DOCUMENTS

| GB | 2351375 A | 12/2000 |
| JP | 09-128305 A | 5/1997 |
| JP | 2000-339098 A | 12/2000 |

OTHER PUBLICATIONS

Clark *Designing Storage Area Networks. A Practicle Reference for Implementing Practical Fibre Channel SAN*, Piason Education, p. 40-42, and 76-83 (2000).

(Continued)

*Primary Examiner* — Thu Nguyen
*Assistant Examiner* — Julian Chang
(74) *Attorney, Agent, or Firm* — Kilpatrick Townsend & Stockton LLP

(57) ABSTRACT

A method is provided with which a name of a virtual port is not changed when virtualized storage is moved among switches. Information about a creator and a borrower of name information is added to a table including name information and address information of a virtual port of a name server managing the name information and the address information. The name information is provided to plural switches and managed. In addition, name information, which can be used commonly among name servers managing the name information and the address information is pooled in advance, and the name information of the virtual port is borrowed from there.

5 Claims, 16 Drawing Sheets

OTHER PUBLICATIONS

Frase "Troubleshooting Storage Networks," Cisco Systems, Inc., 170 West Tasman Dr., San Jose, CA 95134, USA, available on line at: http:www.cisco.com/networkers/nw02/post/presentations/docs/OPT-350.pdf (2002).

Ryuta "Realize Functional Reinforcement and Package Management of a SAN through Virtualization of a Storage," Nikkei Windows Pro 65:13-15 (2002).

* cited by examiner

FIG.4

Diagram showing SERVER (102) connected through SWITCH (100, containing LOGIN SERVER PROGRAM (0xFFFFFE) 205D1 and NAME SERVER PROGRAM (0xFFFFFC) 205E) to STORAGE SYSTEM (103).

- 404A FLOGI →
- ← 405A Accept (address)
- 406A PLOGI(register) →
- ← 407A Accept
- 408 PLOGI →
- 404B FLOGI (from storage)
- 405B Accept (address)
- 406B PLOGI(register)
- 407B Accept
- 409 Accept
- 101 (switch cloud)

FIG.5

Table 205D2:

| PORT ID | PORT TYPE | WWPN | MAP | LUN | LUN WWN |
|---|---|---|---|---|---|
| WWNN | | 5011111000000000 | | | |
| 010100 | ACTUAL F_PORT | 5011111000000001 | | | |
| 010200 | ACTUAL F_PORT | 5011111000000002 | | | |
| 010300 | ACTUAL F_PORT | 5011111000000003 | | | |
| 010400 | ACTUAL F_PORT | 5011111000000004 | | | |
| 01A100 | ACTUAL F_PORT | 50111110000000A1 | | | |
| 01A200 | ACTUAL F_PORT | 50111110000000A2 | | | |
| 01A300 | ACTUAL F_PORT | 50111110000000A3 | | | |
| 01A400 | ACTUAL F_PORT | 50111110000000A4 | | | |
| | | | | | |
| | | | | | |

Labels: 502, 501, 503, 504, 505, 506, 507, 510

FIG.6

| PORT ID | PORT TYPE | WWPN | MAP | LUN | LUN WWN |
|---|---|---|---|---|---|
| | | WWNN 5022220000000000 | | | |
| 020100 | ACTUAL F_PORT | 5022220000000001 | | 1 | 5022220000000101 |
| 020200 | ACTUAL F_PORT | 5022220000000002 | | 2 | 5022220000000102 |
| 02B100 | VIRTUAL F_PORT | 502222000000000B1 | | 1 | 5022220000000201 |
| 020300 | ACTUAL F_PORT | 5022220000000003 | | 2 | 5022220000000202 |
| 020400 | ACTUAL F_PORT | 5022220000000004 | | 1 | 502222000000B101 |
| 02A100 | ACTUAL E_PORT | 5022220000000A1 | | 1 | 5022220000000301 |
| 021200 | ACTUAL E_PORT | 5022220000000A2 | | 2 | 5022220000000302 |
| 02A300 | ACTUAL E_PORT | 5022220000000A3 | | 3 | 5022220000000303 |
| 02A400 | ACTUAL E_PORT | 5022220000000A4 | | | |

FIG.7

| PORT ID | PORT TYPE | WWPN | MAP | LUN | LUN WWN |
|---|---|---|---|---|---|
| | WWNN | 5033333000000000 | | | |
| 030100 | ACTUAL F_PORT | 5033333000000001 | | 1 | 5033333000000101 |
| 030200 | ACTUAL F_PORT | 5033333000000002 | | 2 | 5033333000000102 |
| | | | | 3 | 5033333000000103 |
| 020300 | ACTUAL F_PORT | 5033333000000003 | | 1 | 5033333000000303 |
| 020400 | ACTUAL F_PORT | 5022222000000004 | | 2 | 5033333000000303 |
| | | | | 3 | 5033333000000303 |
| 03A100 | ACTUAL E_PORT | 5033333000000A1 | | | |
| 031200 | ACTUAL E_PORT | 5033333000000A2 | | | |
| 03A300 | ACTUAL E_PORT | 5033333000000A3 | | | |
| 03A400 | ACTUAL E_PORT | 5033333000000A4 | | | |

FIG.8

| PORT ID | PORT TYPE | WWNN | WWPN 5022222000000000 | MAP | LUN | LUN WWN | |
|---|---|---|---|---|---|---|---|
| | | | | | | | 810A |
| 020100 | ACTUAL F_PORT | | 5022222000000001 | → | 1 | 5022222000000101 | 810B |
| | | | | | 2 | 5022222000000102 | 810C |
| 020200 | ACTUAL F_PORT | | 5022222000000002 | → | 1 | 5022222000000201 | 810D |
| | | | | | 2 | 5022222000000202 | 810E |
| 02B100 | VIRTUAL F_PORT | | 50222220000000B1 | | 1 | 502222200000B101 | 810F |
| 020300 | ACTUAL F_PORT | | 5022222000000003 | ⨯ | 1 | 5022222000000301 | 810G |
| 020400 | ACTUAL F_PORT | | 5022222000000004 | ⨯ | 2 | 5022222000000302 | 810H |
| | | | | | 3 | 5022222000000303 | |
| | | | THE REST IS OMITTED | | | | |

| PORT ID | PORT TYPE | WWNN | WWPN 5033333000000000 | MAP | LUN | LUN WWN | |
|---|---|---|---|---|---|---|---|
| | | | | | | | 910A |
| 030100 | ACTUAL F_PORT | | 5033333000000001 | ⨯ | 1 | 5033333000000101 | 910B |
| 030200 | ACTUAL F_PORT | | 5033333000000002 | ⨯ | 2 | 5033333000000102 | 910C |
| | | | | | 3 | 5033333000000103 | 910D |
| 030300 | ACTUAL F_PORT | | 5033333000000003 | ⨯ | 1 | 5033333000000303 | 910E |
| 030400 | ACTUAL F_PORT | | 5033333000000004 | → | 2 | 5033333000000303 | 910F |
| | | | | | 3 | 5033333000000303 | 910G |
| 03B100 | VIRTUAL F_PORT | | 50333330000000B1 | → | 1 | 503333300000B101 | |
| | | | THE REST IS OMITTED | | | | |

WWNN: 5022220000000000

| PORT ID | PORT TYPE | WWPN | MAP | LUN | LUN WWN | BORROWER/LENDER |
|---|---|---|---|---|---|---|
| 020100 | ACTUAL F_PORT | 5022220000000001 | ↑ | 1 | 502222200000000101 | |
| | | | ↑ | 2 | 502222200000000102 | |
| 020200 | ACTUAL F_PORT | 5022220000000002 | ↑ | 1 | 502222200000000201 | |
| | | | ↑ | 2 | 502222200000000202 | |
| 02B100 | VIRTUAL F_PORT | 5022220000000B1 →LENDING | | 1 | 502222200000000B101 | NONE →03B100 |
| 020300 | ACTUAL F_PORT | 5022220000000003 | ↑↑ | 1 | 502222200000000301 | |
| 020400 | ACTUAL F_PORT | 5022220000000004 | ✕ | 2 | 502222200000000302 | |
| | | | | 3 | 502222200000000303 | |
| THE REST IS OMITTED | | | | | | |

FIG.12

WWNN: 5033330000000000

| PORT ID | PORT TYPE | WWPN | MAP | LUN | LUN WWN | BORROWER/LENDER |
|---|---|---|---|---|---|---|
| 030100 | ACTUAL F_PORT | 5033330000000001 | ↑↑↑ | 1 | 503333300000000101 | |
| 030200 | ACTUAL F_PORT | 5033330000000002 | ✕✕ | 2 | 503333300000000102 | |
| | | | | 3 | 503333300000000103 | |
| 030300 | ACTUAL F_PORT | 5033330000000003 | ↑↑↑ | 1 | 503333300000000303 | |
| 030400 | ACTUAL F_PORT | 5033330000000004 | ✕ | 2 | 503333300000000303 | |
| | | | | 3 | 503333300000000303 | |
| 03B100 | VIRTUAL F_PORT | 5033330000000B1 →5022220000000B1 | ↑ | 1 | 503333300000000B101 | NONE →02B100 |
| THE REST IS OMITTED | | | | | | |

| PORT ID | PORT TYPE | WWPN | MAP | LUN | LUN WWN | BORROWER/LENDER |
|---|---|---|---|---|---|---|
| 020100 | ACTUAL F_PORT | 5022220000000001 | → | 1 | 5022220000000101 | |
| 020200 | ACTUAL F_PORT | 5022220000000002 | → | 2 | 5022220000000102 | |
| | | | → | 1 | 5022220000000201 | |
| | | | → | 2 | 5022220000000202 | |
| 02C100 | VIRTUAL F_PORT | 5022220000000C1 | | 1 | 5022220000000C101 | 02C100 |
| 020300 | ACTUAL F_PORT | 5022220000000003 | | 1 | 5022220000000301 | |
| 020400 | ACTUAL F_PORT | 5022220000000004 | | 2 | 5022220000000302 | |
| | | | | 3 | 5022220000000303 | |
| | | THE REST IS OMITTED | | | | |
| 02C100 | N/A | 5022220000000C1 | N/A | N/A | N/A | 02C100 |
| 02C200 | N/A | 5022220000000C2 | N/A | N/A | N/A | |
| 02C300 | N/A | 5022220000000C3 | N/A | N/A | N/A | |
| 02C400 | N/A | 5022220000000C4 | N/A | N/A | N/A | |
| ... | | ... | | | | |
| 02EE00 | N/A | 5022220000000EE | N/A | N/A | N/A | |
| 02EF00 | N/A | 5022220000000EF | N/A | N/A | N/A | |

WWNN: 5022220000000

N/A: NOT APPLICABLE

FIG.15

| PORT ID | PORT TYPE | WWPN | MAP | LUN | LUN WWN | BORROWER/LENDER |
|---|---|---|---|---|---|---|
| 020100 | ACTUAL F_PORT | 5022222000000001 | → | 1 | 5022222000000101 | |
| | | | | 2 | 5022222000000102 | |
| 020200 | ACTUAL F_PORT | 5022222000000002 | → | 1 | 5022222000000201 | |
| | | | | 2 | 5022222000000202 | |
| 02C100 DELETED | VIRTUAL F_PORT | 502222200000000C1 | → | 1 | 5022222000000C101 DELETED | 02C100 → DELETED |
| 020300 | ACTUAL F_PORT | 5022222000000003 | → | 1 | 5022222000000301 | |
| 020400 | ACTUAL F_PORT | 5022222000000004 | → | 2 | 5022222000000302 | |
| | | | | 3 | 5022222000000303 | |
| | | THE REST IS OMITTED | | | | |
| 02C100 | N/A | 502222200000000C1 | N/A | N/A | N/A | 02C100 → 03B100 |
| 02C200 | N/A | 502222200000000C2 | N/A | N/A | N/A | |
| 02C300 | N/A | 502222200000000C3 | N/A | N/A | N/A | |
| 02C400 | N/A | 502222200000000C4 | N/A | N/A | N/A | |
| ... | | ... | | | | |
| 02EE00 | N/A | 502222200000000EE | N/A | N/A | N/A | |
| 02EF00 | N/A | 502222200000000EF | N/A | N/A | N/A | |

N/A: NOT APPLICABLE

US 7,996,560 B2

MANAGING VIRTUAL PORTS IN AN INFORMATION PROCESSING SYSTEM

BACKGROUND OF THE INVENTION

1. Field of the Invention

The present invention relates to a switch-based (storage) virtualization technique in a storage area network (SAN), and to a management method for a name, which is given to a port of a switch providing a virtualized storage.

2. Description of the Prior Art

In a Fibre Channel (FC)-SAN environment, or an IP-SAN environment (i.e. using the internet Small Computer System Interface (iSCSI) obtained by encapsulating the Small Computer System Interface (SCSI) in the Transmission Control Protocol/Internet Protocol (TCP/IP)), an apparatus such as a server or a storage device is treated as a node. To identify a node in the SAN (or in the FC-SAN), each node has associated therewith 24-bit address information called a port ID and 64-bit name information called a World Wide Name (WWN). In addition, in IP-SAN, each node has an IP address (32-bit address information in Ipv4 or 128-bit address information in Ipv6), along with 48-bit address information called a Media Access Control (MAC) address, and 255-byte name information called an iSCSI.

The name information cannot be changed because it is generated based upon information permanently allocated to hardware of a node. Programs of a Simple Name Server (SNS) in the FC-SAN, an internet Storage Name Server (iSNS) in the IP-SAN, and the like are executed, whereby a relationship between the name information and the address information, or the like is managed, and the information is provided. After acquiring or setting the address information, the node connected to the SAN registers the name information and the address information of its own in a table held by an apparatus having these programs (e.g., see Tom Clark "SAN, Implementation of Practical Fibre Channel Storage Area Network", Piason Education, Dec. 25, 2000, p. 40-42, and 76-83, or Mike Frase, "Troubleshooting Storage Networks", [online], [retrieved on Jan. 10, 2003], available on the Cisco Web site.

In a switch providing a storage virtualization mechanism in the SAN environment, a volume or a logical unit (LU) of a virtualized storage is provided (e.g., see Mogi Ryuta, "Realize Functional Reinforcement and Package Management of a SAN through Virtualization of a Storage", Nikkei Windows Pro, August 2002 (No. 65), p. 13-15). In the following description, a port providing a volume or an LU of a virtualized storage is referred to as a virtual port.

BRIEF SUMMARY OF THE INVENTION

Using switch-based storage virtualization, allocation and rearrangement of storage areas in storage systems (of plural vendors connected to a network) can be performed without depending upon a physical configuration of the storage systems. Here, the storage system is assumed to be a system including plural storage devices and a storage control device (for controlling the plural storage devices). However, in the related art, when a virtual port is continuously used with the same name information, only use in a switch is considered. In the future, it is likely that the name information of the virtual port will be changed by movement or reconstitution of the virtualized storage among plural switches, by replacement of the switch providing the virtualized storage, or the like. In a high availability server interrupting operation processing (by change of the name information of the virtualized storage) is not permissible.

This invention provides a method of maintaining and managing name information (of a virtual port) for preventing a situation such as is described above. To do so, a switch in accordance with the present invention adds information relating to a generator and a borrower of name information to a table (including information for managing name information and address information of a virtual port), and lends and borrows name information among plural switches, or to and from a replaced switch.

In addition, the switch in accordance with the present invention pools name information, which can be used commonly among switches (having a name server program for managing name information and address information of a virtual port, or switches having a representative name server program), in advance, and borrows the name information of the virtual port from there.

BRIEF DESCRIPTION OF THE DRAWINGS

FIG. 4 is a diagram showing an outline of a procedure for logging in an FC fabric;

FIG. 5 is a diagram showing an example of a structure of a name management table generated in a switch 101;

FIG. 6 is a diagram showing an example of a structure of a name management table generated in a switch 101A;

FIG. 7 is a diagram showing an example of a structure of a name management table generated in a switch 101B;

FIG. 8 is a diagram showing an example of a structure of a name management table generated in the switch 101A;

FIG. 9 is a diagram showing an example of a structure of a name management table generated in the switch 101B;

FIG. 11 is a view showing an example of a structure of a name management table generated in the switch 101A;

FIG. 12 is a diagram showing an example of a structure of a name management table generated in the switch 101B;

FIG. 14 is a diagram showing an example of a structure of a name management table generated in the switch 101A;

FIG. 15 is a diagram showing an example of a structure of a name management table generated in the switch 101A;

DETAILED DESCRIPTION OF THE INVENTION

A first embodiment of the present invention will be described with reference to FIGS. 1 to 13. In the first embodiment, maintenance and management of name information of virtual ports are performed by lending and borrowing name information among plural switches in an SAN.

Figure 1:
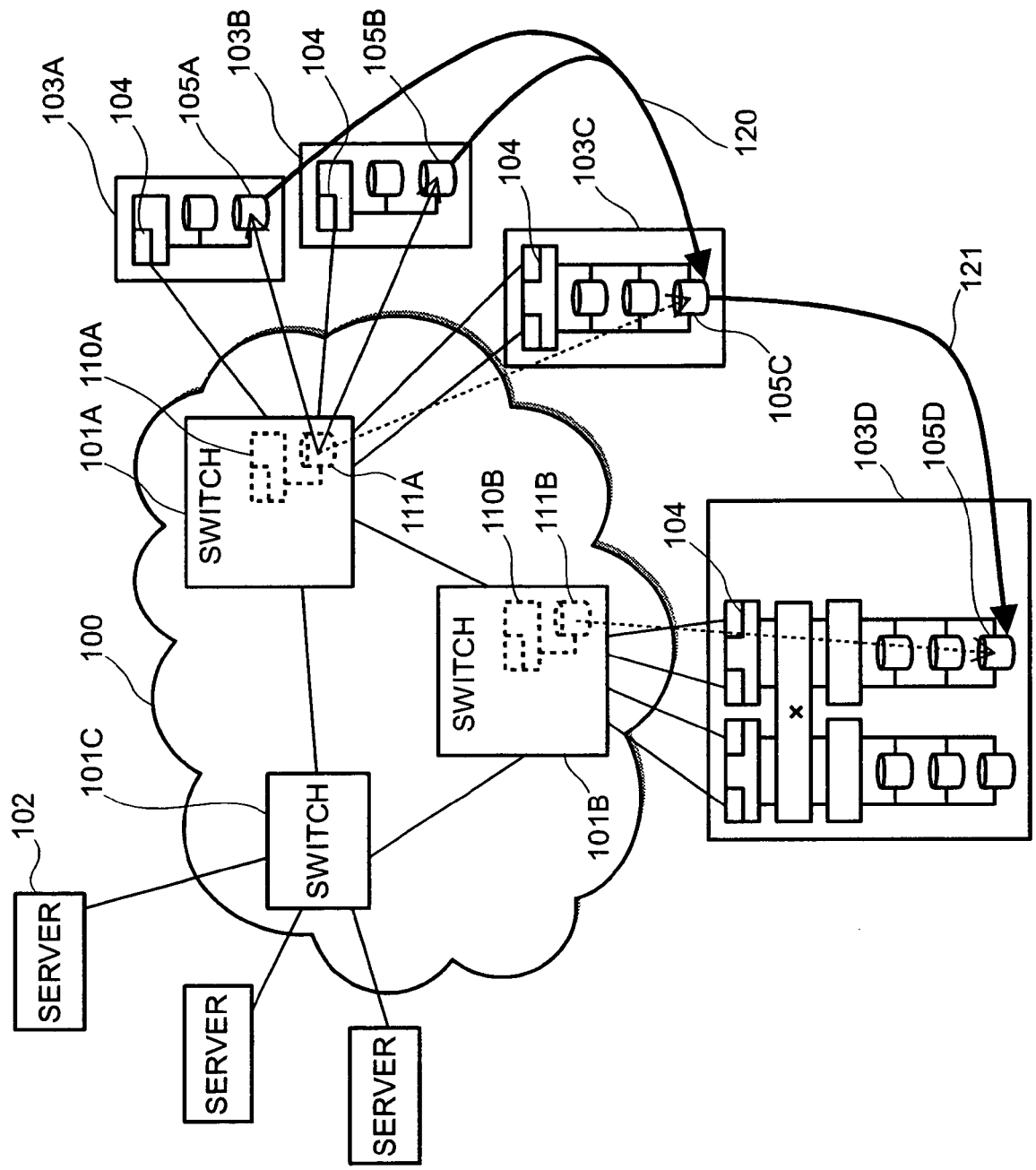
FIG. 1 is a diagram showing an example of a structure of an SAN and virtual ports.

FIG. 1 shows an example of a structure of an SAN including plural switches. The switches include FC switches and IP switches. An SAN 100 comprises plural switches 101A, 101B, and 101C (the switches will be, hereinafter, generally referred to as switch 101). A server apparatus (hereinafter referred to as server) 102 is connected to the switch 101C. Examples of the server include a UNIX server, a PC server, and a mainframe. In FIG. 1, storage systems 103A, 103B, and 103C are connected to the switch 101A, and a storage system 103D is connected to the switch 101B (the storage systems will be, hereinafter, generally referred to as storage system 103). Note that types of storage systems include an entry class, a mid-range class, and a high-end class.

The storage system 103 has a port 104 for making a connection with the switch 101 and the server 102, and plural storage devices 105 are connected under the port 104. In a case in which a virtualized storage is used in the switch 101, a virtual port 110 and a virtualized storage 111 under the virtual port 110 are prepared. FIG. 1 shows an example in which a virtualized storage 111A (of a virtual port 110A) corresponds to a logical unit of a storage device 105A (of the storage system 103A) and to a logical unit of a storage device 105B (of the storage system 103B). Other virtualized storages will be described in the following embodiments. Note that the server 102 and the storage system 103, as well as the server 102 and the switch 101 may form a redundant structure with high availability (HA). That is, the respective components may also be connected by plural lines.

Figure 2:
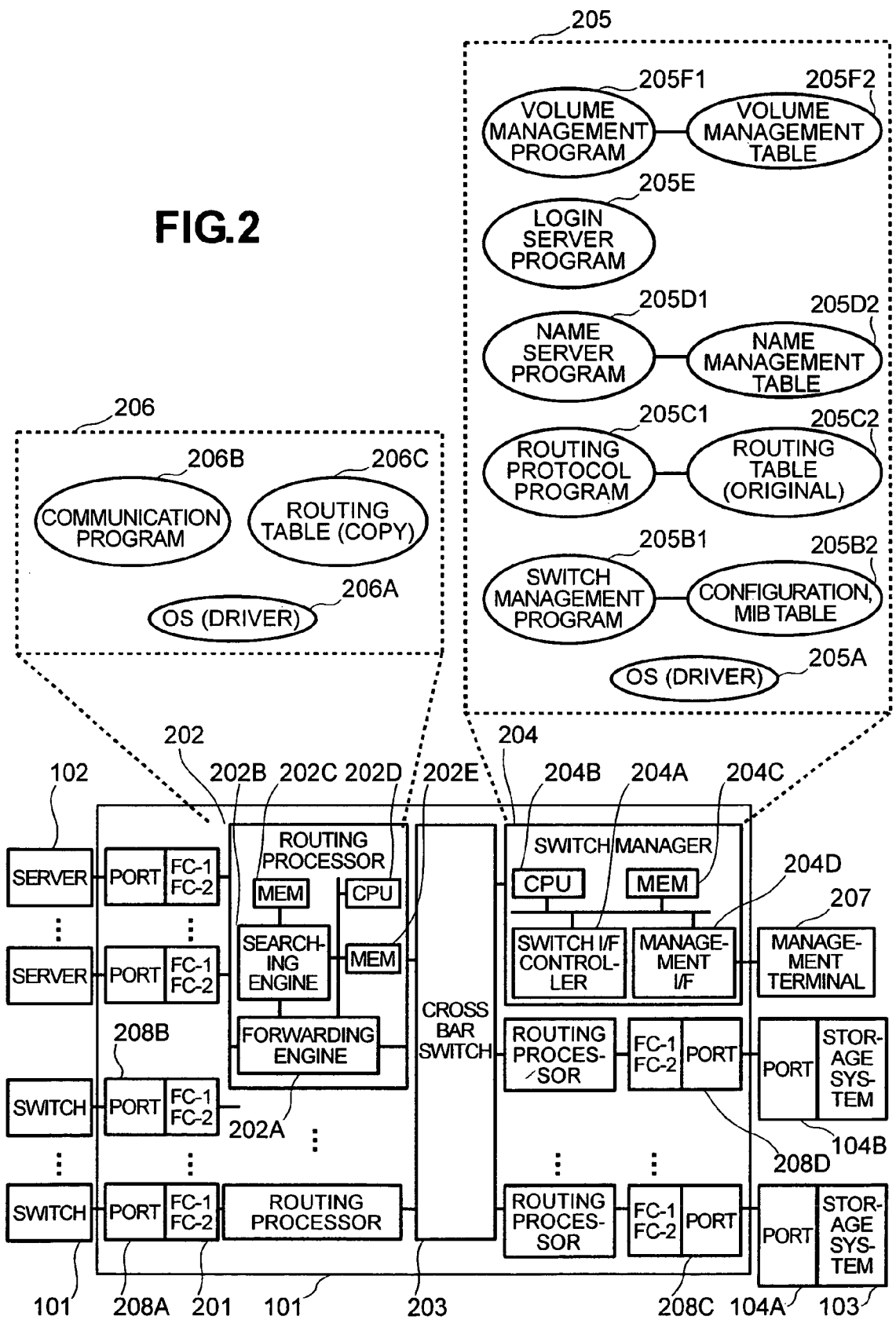
FIG. 2 is a diagram showing an example of a structure of FC switches.

FIG. 2 is a diagram showing an example of a structure of the switch 101 (FC switch in this context) shown in FIG. 1. The switch 101 includes: plural link interfaces 201, which control a physical layer and a data link layer of a Fibre Channel (for connecting the other switches 101, the server 102, the storage system 103, and the like); plural routing processors 202 (which decide if a link interface is to be a destination and convert contents of a packet (if necessary, based upon information of a header of data link layer or upper layers or information part of a packet sent and received)); a switch manager 204 (which performs device management of the switch 101 and calculation of a routing protocol); and a cross-bar switch 203 (which connects the plural routing processors 202 and the switch manager 204). The switch 101 is connected to the storage system 103 having the port 104.

The link interface 201 has a port 208.

The routing processor 202 includes: a searching engine 202B (which searches a header of a packet); a memory 202C (which stores routing information and the like for the searching engine 202B to search a header); a forwarding engine 202A (which rewrites a part of information in a packet when the packet is transferred to the routing processor 202 to be a destination or is virtualized according to a result of searching of the searching engine 202B); a CPU 202D which controls the entire routing processor 202; and a main memory 202E which stores programs and data.

The switch manager 204 includes: a CPU 204B (which controls the entire switch manager 204), a main memory 204C which stores programs and data; a management interface 204D, and a switch interface controller 204A (for communicating with the routing processor 202) or the like that are connected to the cross-bar switch 203. A management terminal 207 (e.g., a dam terminal, a console terminal, etc.) or an ordinary PC (not shown) is connected to the management interface 204D by a serial cable, an Ethernet cable, or the like.

Programs and tables (software and tables are encircled in the figure) are stored in the main memory 202E of the routing processor 202, there is an operating system (hereinafter referred to as OS) 206A, a communication program 206B for communicating with the switch manger 204, a routing table 206C which is a copy of a routing table 205C2 (generated by executing a routing protocol program 205C1, which will be described below), and the like.

Similarly, programs and tables, which are used in executing the respective programs, are stored in the main memory 204C of the switch manager 204, and there is an OS 205A, a switch management program 205B1, and a configuration and Management Information Base (MIB) table 205B2 therefor, a routing protocol program 205C1 such as Fabric Shortest Path First (FSPF) and a routing table 205C2 therefor, a name server program 205D1 (such as an SNS for managing a name of a node apparatus to be connected to the switch 101) and a name management table 205D2 therefor, a login server program 205E (for giving a port ID to a node apparatus to be connected to a network (fabric) of an FC), and a volume management program 205F1 (for constituting a virtualized storage with a logical unit of the storage system 103 to be connected) and a volume management table 205F2 therefor, and the like.

Note that an FC switch shown in FIG. 2 may also be an Ethernet switch using the Ethernet. The Ethernet switch is different from the FC switch in that (1) the link interface 201 controls a physical layer or the like of the Ethernet, (2) a Routing Information Protocol (RIP) and an Open Shortest Path First (OSPF) are treated in the routing protocol program 205C1, (3) the name server program 205D1 is treated in an iSNS, (4) a program corresponding to the login server program 205E is unnecessary, and (5) a packet program for performing processing which cannot be handled only by hardware is necessary, when there is an option information in the packet of the 206.

Figure 3:
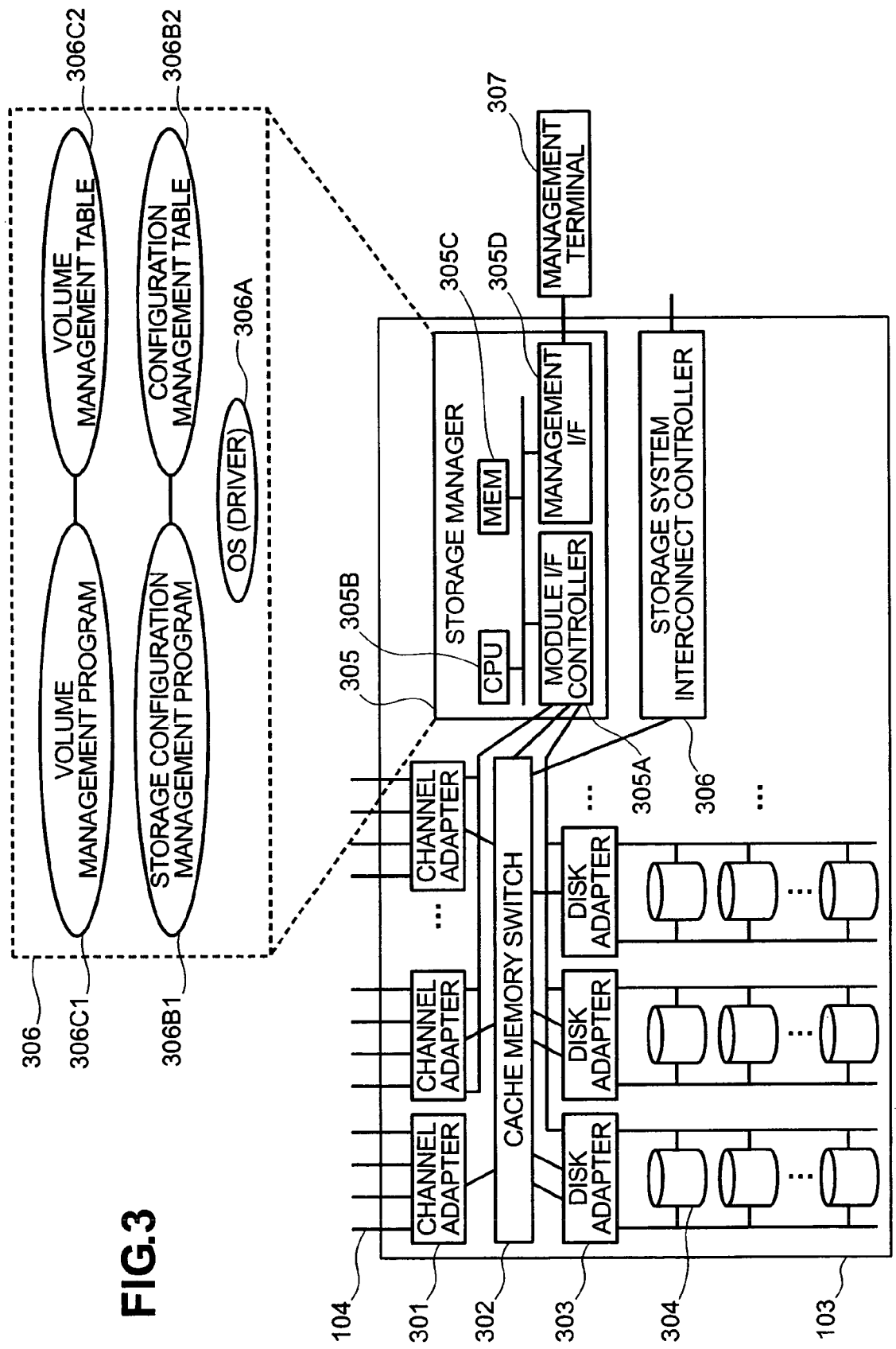
FIG. 3 is a diagram showing an example of a structure of a storage system.

FIG. 3 is a diagram showing an example of a structure of the storage system 103 shown in FIG. 1 (a Redundant Arrays of Inexpensive (Independent) Disks (RAID) in this context).

The storage system 103 comprises: plural channel adapters 301 (which have plural ports 104 for connecting the switch 101, the server 102, and the like); disk adapters 303 (for accessing the plural storage devices 304); a cache memory switch 302 (which connects the plural channel adapters 301 and the plural disk adapters 303); a storage manager 305 (which performs system management and volume management of the storage system 103); a storage systems interconnect controller 306 (for connecting the storage systems via the switch 101); and the like.

The storage manager 305 includes: a CPU 305B (which controls the entire storage manager 305); a main memory 305C (which stores programs and data); a management interface 305D, and a module interface controller 305A (for controlling modules such as the channel adapters 301).

Representative programs and tables are stored in the main memory 305C of the storage manager 305. There is an OS 306A, a storage configuration management program 306B1 and a configuration management table 306B2 therefor, a volume management program for a logical unit in the storage system 103; and a volume management program 306C1 for constituting a virtualized storage and a volume management table 306C2 therefor, and the like.

The following description will be made using the FC switch shown in FIG. 2 as the switch 101. The case in which an Ethernet switch is used will be omitted because a description thereof will be the same.

FIG. 4 is a diagram showing an outline of a login procedure in the case where the server 102 and the storage system 103, which are connected to the SAN 100, are connected to an FC fabric (which is a network for a Fibre Channel).

In the IP network, an IP address may be set statically or may be set dynamically according to a Dynamic Host Configuration Protocol (DHCP). In the Fibre Channel, only an address (called a port ID) is dynamically set. The server 102 and the storage system 103 first send requests for fabric login (FLOGI) 404A and 404B, respectively, to the switch 101 (a port ID to be a destination is 0xFFFFFE), and the switch 101 executes the login server program 205E, thereby sending messages Accept 405A and 405B allocating port IDs to the server 102 and the storage system 103, respectively. Next, the server 102 and the storage system 103 send requests for port login (PLOGI) 406A and 406B, respectively, to the switch 101 (a port ID to be a destination is 0xFFFFFC), and the switch 101 executes the name server program 205D1, thereby registering a port ID, a port type, a port name, a service class to be supported, and the like in the name management table 205D2. Messages (Accept 407A and 407B) of completion of the registration are also sent to the server 102 and the storage system 103 (which have sent the request). Thereafter, for example, the server 102 performs port login in order to use the storage system 103 and establishes communication of the data link layer of the Fibre Channel.

FIG. 5 is a diagram showing an example of a structure of the name management table 205D2 which is generated by executing the name server program 205D1 of the switch 101 in the login procedure shown in FIG. 4.

As information of an entry 510 for each port, there is a port ID 502 (of 24 bits), a port type 503, and a World Wide Port Name (WWPN) 504 (which is a 64-bit port name), with respect to a request for port login from the storage system 103. The information also includes a Logical Unit Number (LUN) 506 (which is a number of the logical unit incorporated in the storage system 103), a 64-bit LUN WWN 507 (which is a name of the LUN), MAP information 505 (which represents mapping of the WWPN 504 and the LUN 506), and a World Wide Node Name (WWNN) 501 (which is a node name for each switch). One row in which these pieces of information are stored is hereinafter referred to as an entry (510).

In the example of FIG. 5, four entries are used for connection with the server 102 (port type 503 is F_port) and four entries are used for connection with the other switches 101 (port type 503 is E_port). The word "actual" is affixed to the port type in order to distinguish the port type from a virtual port which may appear in the following description. Values of the port ID 502, WWPN 504, and LUN WWN 507 are hereinafter represented by hexadecimal digits. Note that WWPN 504 is owned by the switch 101, the server 102, or the storage system 103. However, the switch 101, the server 102, and the storage system 103 cannot be distinguished by the values of the hexadecimal digits shown below.

FIG. 6 is a diagram showing an example of a structure of a name management table 205D2 which is generated by executing the name server program 205D1 (of the switch 101A shown in FIG. 1). In the example of FIG. 6, seven entries are used in the connection with the storage systems 103A, 103B, and 103C (port type 503 is F_port as in the server 102), and four entries are used in the connection with the switches 101B and 101C. Map information 505 of the WWPN 504 and the LUN 506 is indicated by arrows for ease of explanation.

A virtualized storage 111A, and the virtual port 110A shown in FIG. 1 are as indicated by an entry 610E (port type 503 is virtual F_port), becomes a virtualized storage using logical units of entries 610B and 610D according to MAP information 505 indicated by the dotted line.

When the virtualized storage 111A (corresponding to logical units of the storage devices 105A and 105B in FIG. 1) is moved to a logical unit of the storage device 105C of the storage system 103C (as indicated by arrow 120), the MAP information 505 changes to mapping indicated by the bold line from mapping indicated by the dotted line (the virtualized storage 111A changes to a virtualized storage corresponding to an entry 610H). That is, with the movement of a virtualized storage in the switch 101, only the MAP information 505 changes, while port ID 602 and WWPN 604 do not change.

Next, the structure of the name management table 205D2 will be described in an association with FIG. 2. For example, it is assumed that an LUN of a storage system corresponding to an entry 610A of FIG. 6 corresponds to a port 104A of the storage system in FIG. 2. In this case, a host accesses the port 104A of the storage system from a port 208C of a switch (a port ID of this port is 0x020100 corresponding to the port ID 502 of the entry 610A) through a port 208A of a switch (a port ID of this port is 0x02A100 corresponding to the port ID 502 of the entry 610I).

Next, it is assumed that the port 208B corresponds to the entry 610E of FIG. 6. In this case, the host accesses a virtual port (an port ID of this port is 0x02B100 corresponding to the port ID 502 of the entry 610E) from the port 208B. Since the MAP information 505 of the entry 610E indicates LUNs of the entries 610B and 610D, the host accesses the port 104A of the storage system from a port 208C of the switch, or accesses the port 104B of the storage system from a port 208D of the switch (a port ID of this port is 0x020200 corresponding to the port ID 502 of the entry 610D), depending upon an address to access. Note that the port 104 of FIG. 2 corresponds to the port 104 of FIG. 3. These steps have been carried out by the related art.

Problems which occur when the movement of a virtualized storage is carried out (in related art, in order to move the virtualized storage 111A corresponding to the logical unit of the storage device 105C in FIG. 1 to the logical unit of the storage device 105D of the storage system 103D as indicated by arrow 121) will be described with reference to FIGS. 7 to 10. The following description assumes that switch 101A is an origin (of movement of the virtualized storage) and switch 101B is a destination.

FIG. 7 is a diagram showing an example of a structure of the name management table 205D2 of the switch 101B before the virtualized storage 111A moves. In the example of FIG. 7, six entries are used in connection with the storage system 103D and four entries are used in connection with the switches 101A and 101C.

FIGS. 8 and 9 are diagrams showing examples of a structure of the name management table 205D2 of the switches 101A and 101B, respectively, after the virtualized storage 111A has moved.

Figure 10:
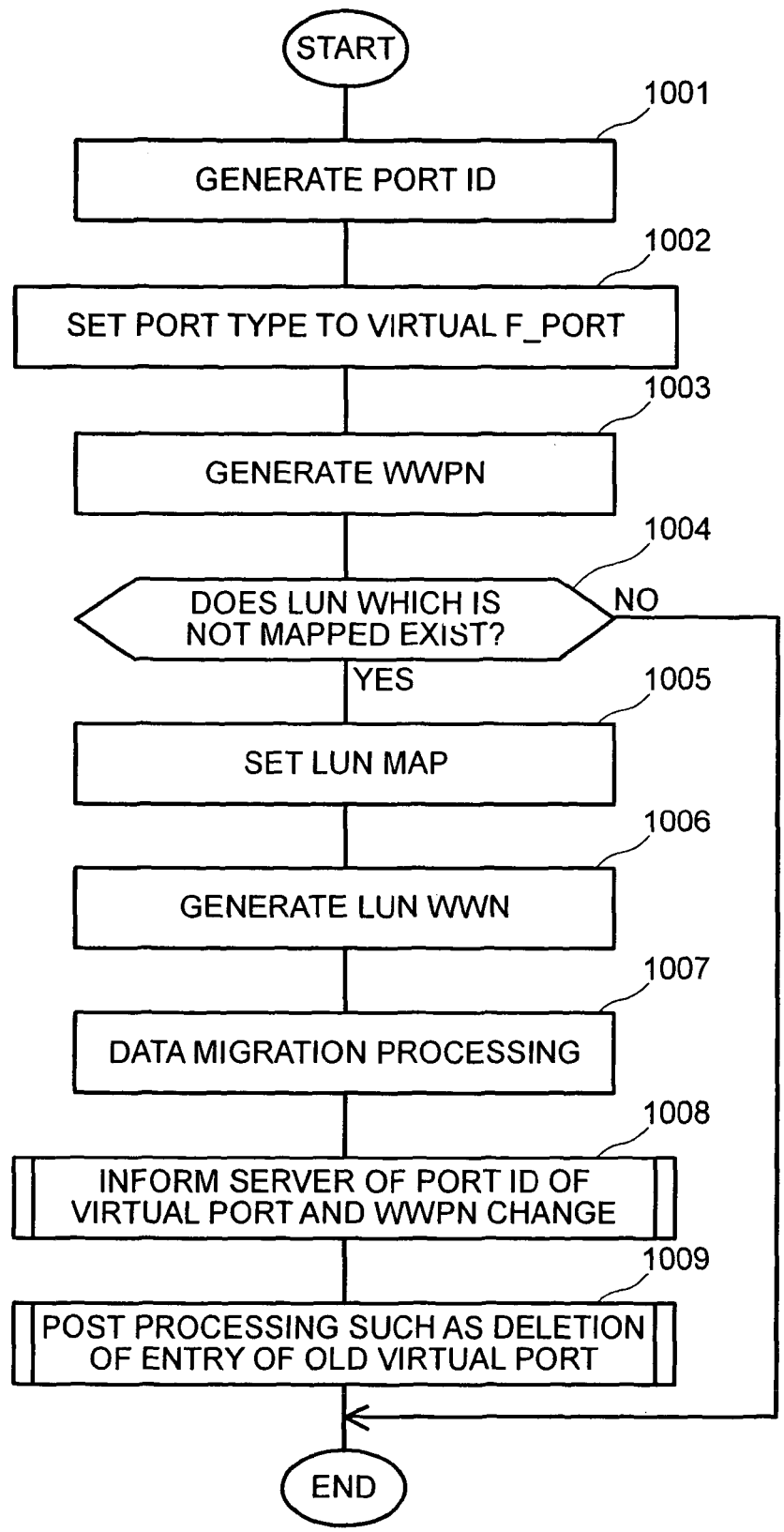
FIG. 10 is a flowchart describing an example of an update processing for a virtual port in the switch 101B.

FIG. 10 shows a processing flow, from preparation to update of a virtual port in the switch 101B. The processing flow of FIG. 10 will be described with reference to FIGS. 7 to 9. Note that movement of a virtualized storage is performed by sending an instruction to the CPU 204B from the management terminal 207, via the management I/F 204D of the switch manager 204.

In order to move the virtualized storage 111A, the CPU 204B (of the switch manager 204) generates a port ID on an entry 910G (step 1001), sets a port type to virtual F_port (step 1002), generates a WWPN (step 1003), and confirms whether or not a logical unit (to be a destination of movement of the virtualized storage) exists (step 1004). If the logical unit does not exist, the CPU 204B ends the processing. If an logical unit (entry 710F) to be a destination of movement exists, as shown in entries 910G and 910F, the CPU 204B sets MAP information 605 (step 1005), generates an LUN WWN 606 on the entry 910G (step 1006), and performs data migration processing for migrating data from the storage device 105C to the storage device 105D (step 1007). Although details of the data migration processing are not described in this embodiment, it is assumed that the data migration processing can also cope with data migration while input/output (I/O) of read or write is performed online (see Patent Applications 2000-152672 and 2000-63289).

After completion of the data migration processing, the CPU 204B informs the server 102 or the like, which was using the virtualized storage 111A, that the port ID and the WWPN have been changed (step 1008). A remote state change notification frame (which is a State Change Notification in an SNS of a Fibre Channel) is used (State Change Notification (SCN) of an iSNS in an iSCSI). Since a port ID and a WWPN of an origin of movement are in an entry 710E and a port ID and a WWPN of a destination of movement are in an entry 910G, change of the WWPN occurs in the related art. Unless the WWPN of the virtual port 110A (used in the server 102) is changed, the virtualized storage 111B after movement cannot be used. Suspension of an operation such as stopping an application on the server 102 once may be required for the change of the WWPN. After it has become possible to use the virtualized storage 111B in the server 102, the CPU 204B performs processing for deleting information (an entry 810E in FIG. 8) on the name management table which related to the virtualized storage 111A, deleting data in the logical unit of the storage system 103, or the like (step 1009).

Next, with reference to FIGS. 11 to 13, a method will be described with which a virtual port from a server does not have to be changed even if a virtualized storage is moved.

FIGS. 11 and 12 are diagrams showing, as a comparison with FIGS. 8 and 9, respectively, an example of a structure in which information of a borrower/lender 1101 (indicating the port ID 502 of a borrower or a lender of the WWPN 504) is further added to the name management table 205D2 (which the switches 101A and 101B generate, respectively).

Figure 13:
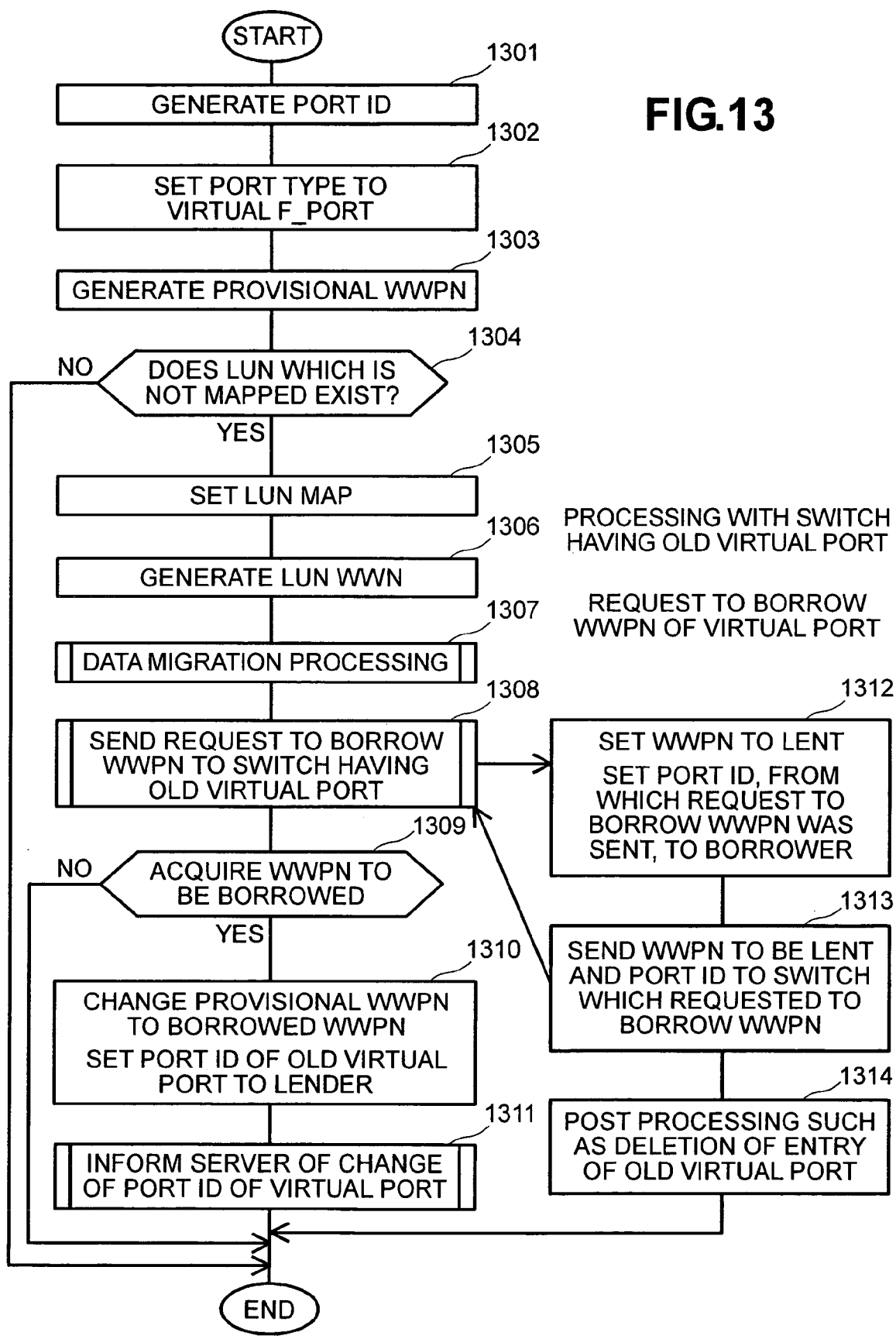
FIG. 13 is a diagram showing an example of an update processing flow in a moving destination switch of a virtual port.

FIG. 13 is a view showing an example of a processing flow about generation to update of a virtual port in the switch 101B and exchanges with the switch 101A. The processing flow of FIG. 13 will be hereinafter described with reference to FIGS. 11 and 12.

Steps 1301 to 1307 of FIG. 13 correspond to steps 1001 to 1007 of FIG. 10. However, step 1303 is generation of a provisional WWPN (because a WWPN is changed in a later step). After performing data migration processing from the storage device 105C to the storage device 105D (step 1307), the CPU 204B sends a request to borrow a WWPN to the switch 101A (step 1308) and, if the WWPN can be borrowed, acquires the WWPN from the switch 101A (step 1309), changes the provisional WWPN to the borrowed WWPN, and sets a port ID of a virtualized storage of an origin of movement to the borrower/lender 1101 of an entry 1210G (step 1310). Then, the CPU 204B informs the server 102 or the like, which used the virtualized storage 111A, that the port ID has been changed (step 1311).

In the present invention, since the WWPN of the entry 1210G is the same as the WWPN of the origin of movement of the virtualized storage, the virtualized storage 111A used in the server 102 can be continuously used with only change of the port ID (even if it is really changed to the virtualized storage 111B).

On the other hand, upon receiving the request to borrow a WWPN, the CPU 204B of the switch 101A indicates that a pertinent WWPN is lent, and sets a port ID of the virtualized storage 111B of a destination of movement to the borrower/lender 1101 of the entry 1110E (step 1312), and sends the WWPN, which is lent to the switch 101B, and the port ID to the switch 101B (step 1313). After it has become possible to use the virtualized storage 111B in the server 102, the CPU 204B of the switch 101A performs process of deleting information on a name management table (relating to the virtualized storage 111A), deleting data in the logical unit of the storage system 103, and the like (step 1314).

Next, a second embodiment of the present invention will be described with reference to FIGS. 14 to 18. In the second embodiment, in an SAN, a case will be described where maintenance and management of name information of a virtual port is performed by pooling name information for a virtual port (which can be used commonly among plural switches and representative switches in advance) and borrowing the name information from there. The following description will be made assuming that a switch having a WWPN which can be used commonly is the switch 101A (the present invention is not limited to this assumption, and any switch may have the WWPN). Note that the borrower/lender 1101 may be divided into items of a borrower and a lender, or may be in other table formats.

FIG. 14 is a diagram showing an example of a structure of the name management table 205D2 at the time when a virtualized storage uses a WWPN, which can be used commonly, in the switch 101A. Here, a WWPN for a virtual port (which can be used commonly) is registered in advance. Entry 1420 is an entry of the WWPN (which can be used commonly). For ease of explanation, the port ID 502 is set to a fixed range (in FIG. 14, 02C100 to 02EF00).

FIG. 15 is a diagram showing an example of a structure of the name management table 205D2 (of the switch 101A) before and after movement of a virtualized storage.

Figures 16, 17:
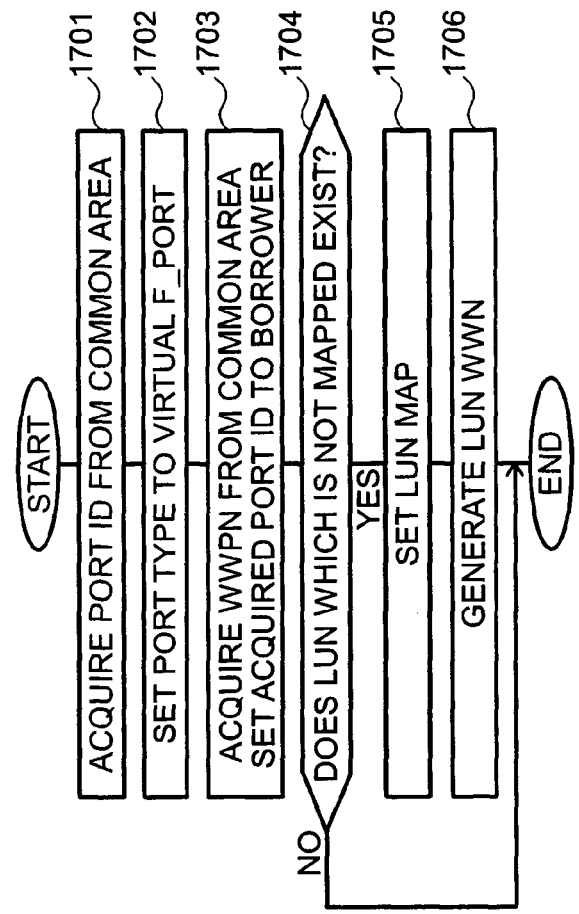
FIG. 16 is a diagram showing an example of a structure of a name management table generated in the switch 101B.
FIG. 17 is a diagram showing an example of a generation processing flow for a virtual port in a switch.

FIG. 16 is a diagram showing an example of a structure of the name management table 205D2 of the switch 101B at the time of generation and update of a virtualized storage.

FIG. 17 is a diagram showing an example of a processing flow for generating a virtual port in a switch.

Figure 18:
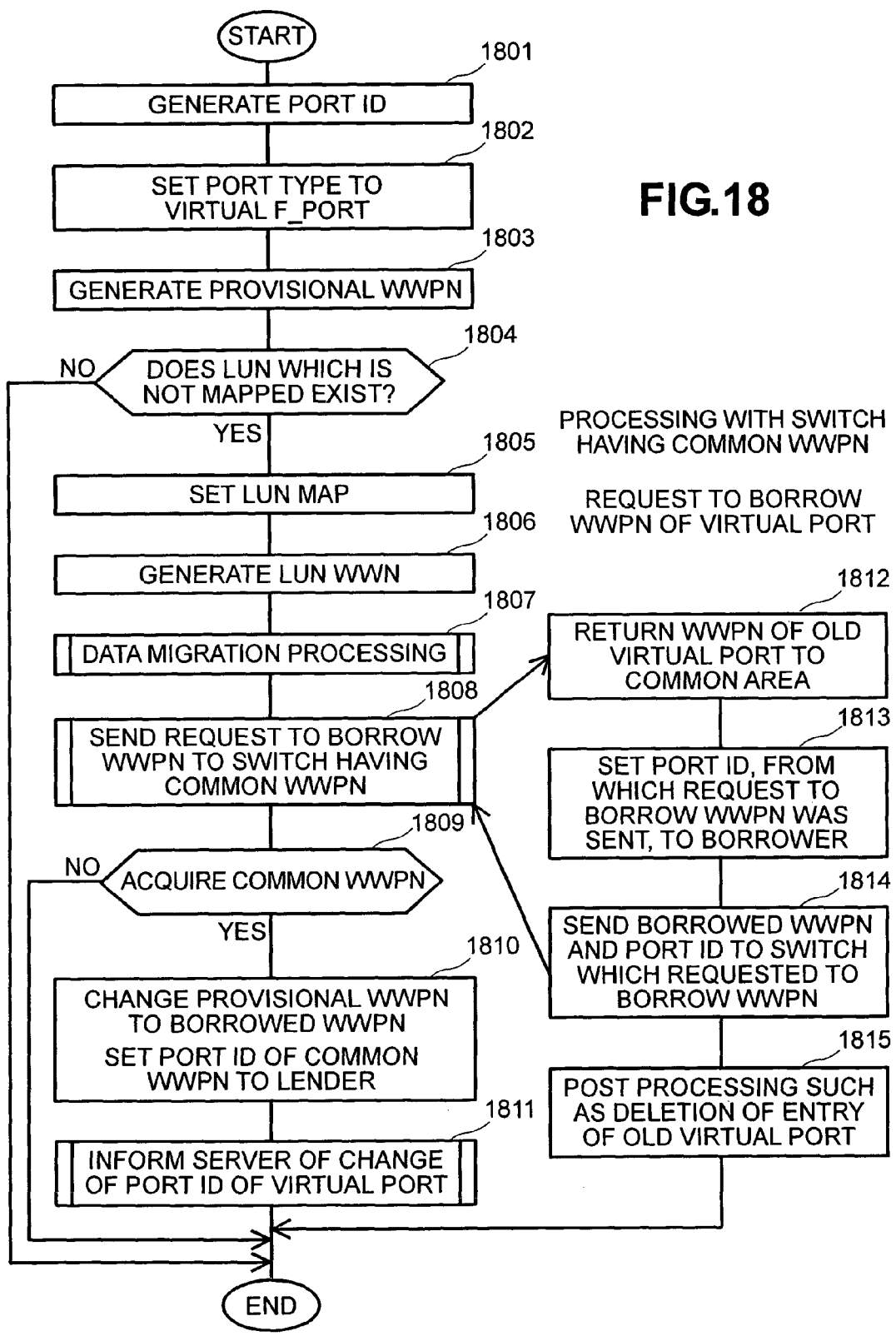
FIG. 18 is a diagram showing an example of an update processing flow in the switch 101B.

FIG. 18 is a diagram showing an example of a processing flow to update a virtual port in the switch 101A and exchanges with the switch 101B. The processing flow of FIGS. 17 and 18 will be hereinafter described with reference to FIGS. 15 and 16.

Steps 1701 to 1706 of FIG. 17 correspond to steps 1301 to 1306 of FIG. 13, respectively. However, steps 1701 and 1703 are for processing to acquire a port ID and a WWPN from an area which can be used commonly (here, an entry 1420A). After acquiring the port ID and the WWPN, the CPU 204B sets the acquired port ID to the borrower/lender 1101 (step 1703).

Steps 1801 to 1811 of FIG. 18 correspond to steps 1301 to 1311 of FIG. 13. FIG. 18 is different from FIG. 13 only in that a switch is changed to a switch having a WWPN, which can be commonly used by acquirers of the WWPN (steps 1808 to 1810).

On the other hand, upon receiving a request to borrow a WWPN, the CPU 204B of the switch 101A deletes the pertinent WWPN by returning it to a commonly used area (in FIG. 15, an entry 1520A) and also deletes a port ID of a virtualized storage (of a destination of movement to the borrower/lender 1101 of an entry 1510E) by lending it to the switch 101B (step 1812). Then, the CPU 204B sets the port ID of the switch 101B, from which the request to borrow the WWPN was sent, to the borrower/lender 1101 of the entry 1520A of the switch 101A and sends the WWPN, which is lent to the switch 101B, and the port ID to the switch 101B (step 1814). After it has become possible to use the virtualized storage 111B in the server 102, the CPU 204B performs processing for deleting information on the name management table (which is related to the virtualized storage 111A), and deleting data in the logical unit of the storage system 103, or the like (step 1815).

Next, a third embodiment of the present invention will be described with reference to FIGS. 19 and 20. Here, an example is presented wherein the structure of the switch of FIG. 2 is included in the structure of the storage system shown in FIG. 4.

Figure 19:
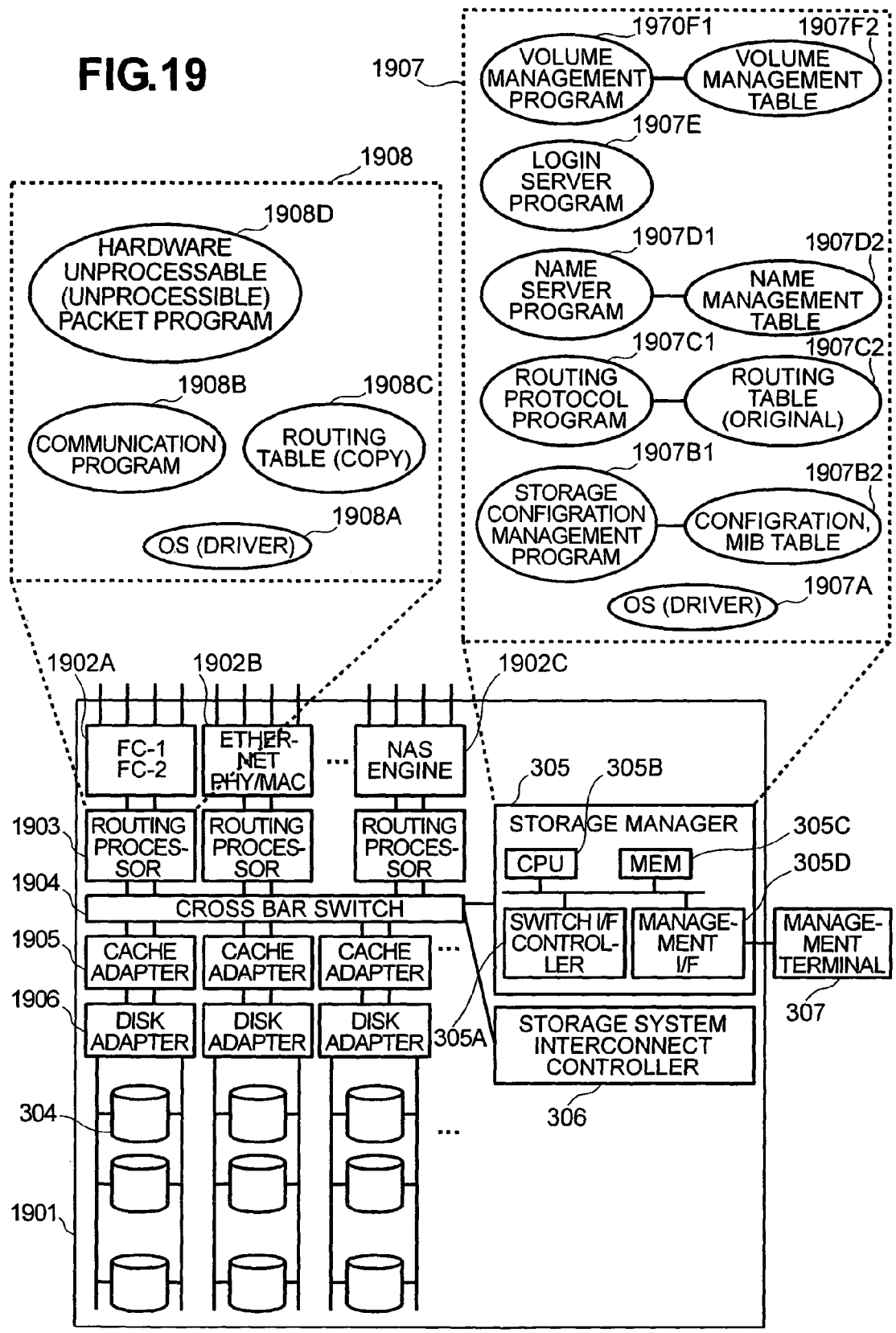
FIG. 19 is a diagram showing an example of a structure of a storage system incorporating a switch function.

FIG. 19 is a diagram showing an example of a structure of a storage system such as a RAID apparatus incorporating a switch function. A storage system 1901 comprises: plural link interfaces 1902A which control a physical layer and a data link layer of a Fibre Channel for connecting the switch 101, the server 102, and the storage system 103; plural link interfaces 1902B which control a physical layer and a data link layer of the Ethernet; plural link interfaces 1902C for accessing a storage on a file base such as a network attached storage (NAS); plural routing processor 1903 as in FIG. 2, plural disk adapters 1906 for accessing the plural storage devices 304; plural cache adapters 1905 which control a cache memory for each disk adapter 1906; the storage manager 305 which performs system management and volume management of a storage system, routing control of a switch, and the like; the storage systems interconnect controller 306 for connecting storage systems, and the like. The structure of the storage manager 305 is the same as that illustrated in FIG. 3.

A representative program and table of the storage manager has a structure which is a combination of a representative program and table 205 and the like in the switch manager of FIG. 2 and a representative program and table 306 in the storage manager shown in FIG. 3. A representative program and table of a routing processor has a structure which is a combination of a representative program and table 206 and the like in the routing processor of FIG. 2.

Figure 20:
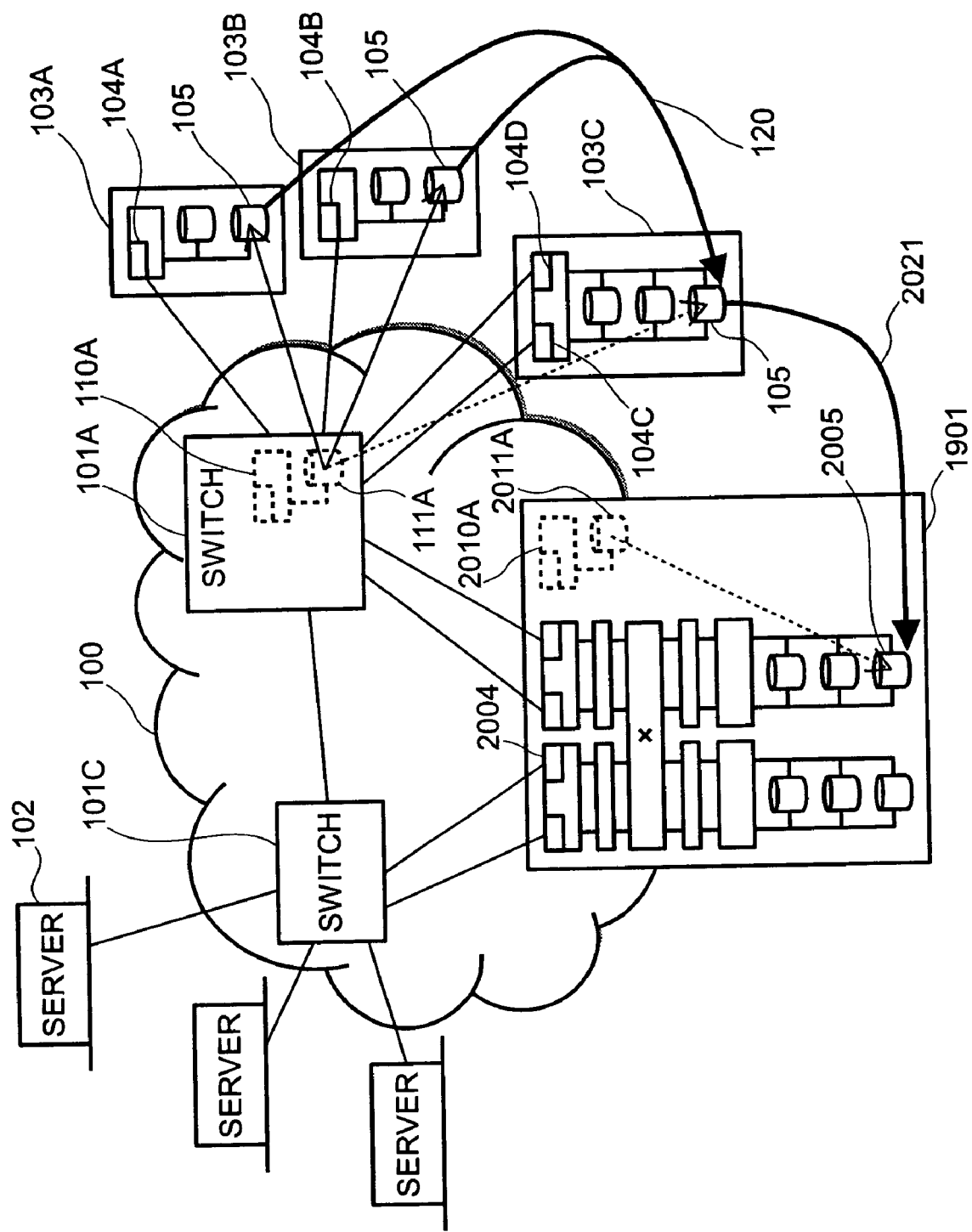
FIG. 20 is a diagram showing an example of a structure of an SAN including the storage system incorporating a switch function.

FIG. 20 shows an example of a structure of an SAN and a virtual port in the case where the switch 101B and the storage system 103D shown in FIG. 1 are replaced by the storage system 1901 (incorporating a switch function shown in FIG. 19).

A description of the case where the virtualized storage 111A of FIG. 20 is moved (arrow 2021) to a virtualized storage 2011A of the storage system 1901 will be omitted because it can be easily analogized from the descriptions in the first and second embodiments.

Note that, although a magnetic medium is often used as the storage device 105, other media such as an optical medium may be used. In addition, the program described in the present invention may be transferred from a storage medium such as a CD-ROM or may be downloaded from other devices through a network.

According to the present invention, name information of a virtual port can be maintained and managed by movement or reconstruction of a virtualized storage among plural switches, replacement of a switch, and the like. In addition, movement or the like of a virtualized storage can be performed without interruption in the case in which a high availability server performs operation processing using a virtualized storage.

What is claimed is:

1. An information processing system including:
a first switch;
a first storage system connected to the first switch and having a first logical unit;
a second switch connected to the first switch and providing a second virtualized storage volume to a server; and
a second storage system connected to the second switch and having a second logical unit which is associated to the second virtualized storage volume,
the first switch and the second switch, each comprising:
a plurality of physical ports for connection to a storage system and communication with a switch;
a control processor; and
a memory to store name management information including a port ID, a WWPN, a LUN, a LUN WWPN, mapping information, and a borrower lender field, wherein the mapping information relates the WWPN, the LUN, the LUN WWPN, and the borrower lender field,
wherein the memory of the first switch further stores a first program including instructions that, when executed by the processor of the first switch, cause the processor to:
set a first virtual port of a first virtualized storage volume when data stored in the second logical unit is migrated to the first logical unit by changing the name management table of the first switch;
set a provisional port name to the first virtual port of the first virtualized storage volume by changing the name management table;
associate the first virtualized storage volume with the first logical unit included in the first storage system;
send a request to the second switch, which requests to borrow a port name of a second virtual port for the second virtualized storage volume in the second switch;
receive from the second switch, in response to the request, a port ID of the second virtual port for the second virtualized storage volume; and
set the borrower lender field to the port ID received from the second switch.

2. An information processing system according to claim 1, wherein the first memory stores the port name associating with a logical unit number of the first storage system, and lender information indicating a lender of the port name, the lender is the second switch.

3. An information processing system according to claim 1, wherein:
the second switch is provided with plural second ports for making connection with the second storage system and the first switch, a second processor for controlling the second switch, and a second memory storing a second program and information, the second program including instructions that, executed by the second processor, cause the second processor to:
receive the request, which is requests to obtain the port name, from the first switch;
send the port name corresponding to the request to the first switch; and
delete the port name of the second virtual port.

4. A first switch connected to a first storage system and a second switch, the first switch comprising:
plural ports for making connection to the first storage system and the second switch, the first storage system having a first logical unit and the second switch providing a second virtualized storage volume, which is associated to a second logical unit in a second storage system, to a server;

a processor for controlling the first switch; and a memory storing name management information including a port ID, a WWPN, a LUN, a LUN WWPN, mapping information, and a borrower lender field, wherein the mapping information relates the WWPN, the LUN, the LUN WWPN, and the borrower lender field, the memory further storing a first program including instructions that, when executed by the processor, cause the processor to:

set a first virtual port of a first virtualized storage volume when data stored in the second logical unit is migrated to the first logical unit by changing the name management table of the first switch;

set a provisional port name to the first virtual port of the first virtualized storage volume by changing the name management table of the first switch;

associate the first virtualized storage volume with the first logical unit included in the first storage system; and send a request to the second switch, which requests to obtain a port name of a second virtual port for the second virtualized storage volume in the second switch;

receive from the second switch, in response to the request, a port ID of the second virtual port for the second virtualized storage volume from the second switch; and set the borrower lender field to the port ID received from the second switch.

5. A first switch according to claim 4, wherein the memory stores the port name associating with a logical unit number of the first storage system, and lender information indicating a lender of the port name, the lender is the second switch.

* * * * *